May 18, 1937.  J. A. ROBLES  2,080,786
RECEPTACLE COVER
Filed Feb. 11, 1935
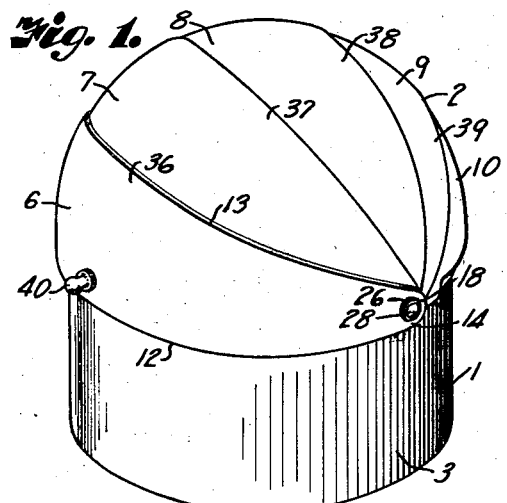
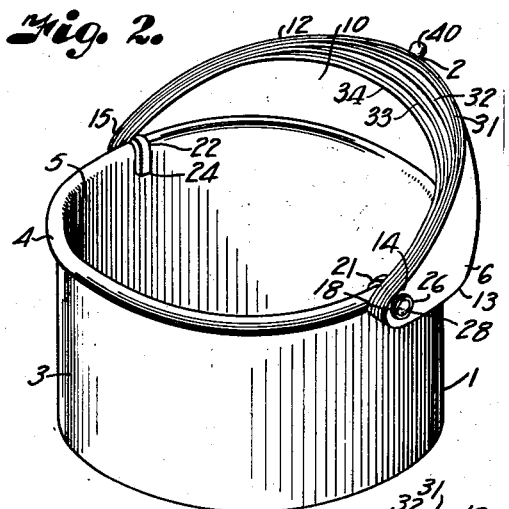
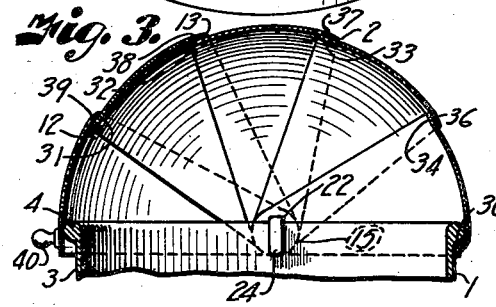
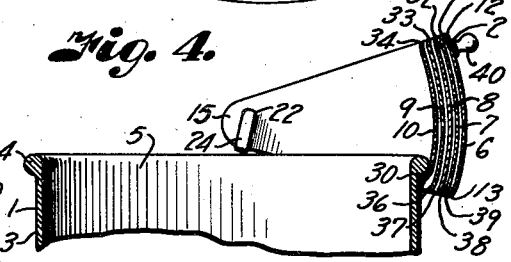
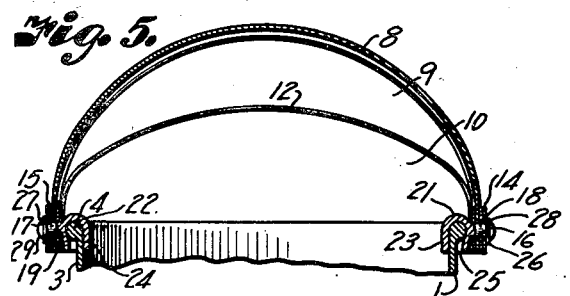
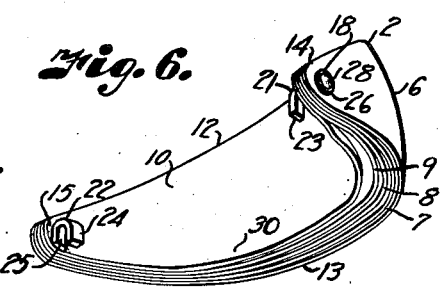
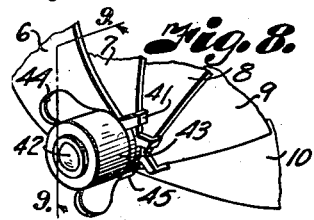
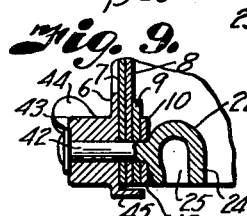
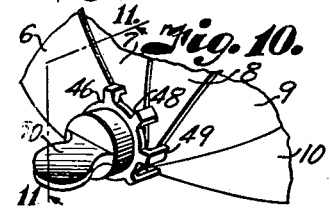
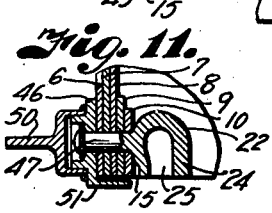
INVENTOR.
Jose A. Robles.
BY
ATTORNEY.

Patented May 18, 1937

2,080,786

UNITED STATES PATENT OFFICE 2,080,786

RECEPTACLE COVER

Jose A. Robles, Kansas City, Mo.

Application February 11, 1935, Serial No. 5,982

3 Claims. (Cl. 220—30)

This invention relates to receptacles and particularly to covers therefor, and has for its principal objects to provide a collapsible cover which may be readily attached to and become a part of the receptacle; to provide a cover that may be easily manipulated to and from open and closed positions; and to provide a cover which is of neat and attractive appearance.

In accomplishing these and other objects of the invention, as hereinafter pointed out, I have provided improved details of structure, the preferred forms of which are illustrated in the accompanying drawing, wherein:

Fig. 1 is a perspective view of a receptacle equipped with a cover embodying the features of the present invention and showing the cover in closed position.

Fig. 2 is a similar view showing the cover in open position.

Fig. 3 is a diametric section through the cover and upper portion of the receptacle when the cover is in closed position.

Fig. 4 is a similar section when the cover is in open position and illustrating a step in its application to the rim of the receptacle.

Fig. 5 is a section taken at right angles to the section shown in Fig. 3, particularly illustrating the clip mounting of the trunnions which connect the cover sections.

Fig. 6 is a perspective view of the cover sections shown in nested position and detached from the receptacle.

Fig. 7 is a development of one end of a gore from which the sections are formed.

Fig. 8 is a detail perspective view of a portion of a modified form of cover.

Fig. 9 is a section on the line 9—9, Fig. 8.

Fig. 10 is a fragmentary section of a further modified form of the invention.

Fig. 11 is a section on the line 11—11, Fig. 10.

Referring more in detail to the drawing:

1 designates a receptacle and 2 a cover therefor embodying the features of the present invention.

The receptacle 1 may be of cylindrical formation and have a vertical wall 3 terminating at its upper edge in an outwardly extending rim or flange 4 to which the cover 2 is detachably anchored for movement to and from closed position over the open top 5 of the receptacle as now to be described.

The cover 2 includes a plurality of substantially lune shaped sections 6, 7, 8, 9 and 10, each of which is pressed from a gore shaped sheet 11 shown in Fig. 7 to substantially the shape of a spherical lune having front and rear edges 12 and 13 which are formed substantially on the great circle of an imaginary sphere of which the sections when extended form the surface thereof. The edges 12 and 13, however, are sufficiently spaced apart at the ends to form ears 14 and 15 having openings 16 and 17 located with their axes in the axis of curvature of the sections and whereby the sections are mounted on trunnions 18 and 19 to move to and from nested position, that is, in position where all the sections are in alignment as shown in Fig. 2.

The trunnions 18 and 19 have clip shaped heads 21 and 22 preferably formed integrally with their inner ends and which have depending ears 23 and 24 spaced apart as at 25 to engage the respective inner and outer sides of the rim as shown in Fig. 5. The space 25 at the terminals of the ears is preferably of less width than the thickness of the rim so that when they spring thereover the clips are clampingly retained on the rim.

The trunnions 18 and 19 thus extend radially from the rim of the receptacle in axial alignment with each other in mounting the sections of the cover which are retained thereon by the clip shaped heads 21 and 22 engaging the inner section and by washers 26 and 27 sleeved over the ends of the trunnions and engaging the outer section, the washers being secured by riveting the ends of the trunnions over their outer faces as shown at 28 and 29 in Fig. 5.

One of the sections, for example the section 10, has its rear edge provided with a channel shaped groove 30 that is pressed therein to form a seat for accommodating the rim of the receptacle and which cooperates with the clip shaped heads 21 and 22 to anchor the section to the receptacle. The other sections, however, are free to pivot upon the trunnions in telescoping or nesting relation with each other to move to and from closed position as shown in Fig. 3.

In order to successively move the sections when the other outer section 6 is carried toward closing position, the forward edge of each section 7, 8, 9 and 10 is slightly flanged upwardly adjacent the center portion thereof as indicated at 31, 32, 33 and 34 to interengage with inwardly flanged edges 36, 37, 38 and 39 of the sections 6, 7, 8 and 9, respectively.

It is thus apparent that when the sections are in nested position and the outer section 6 is moved toward closed position, the downturned edge thereof will engage the upturned edge of the section 7 to cause it to move toward closing position and likewise the downturned edge of the section 7 will interengage the section 8 and so on to move all the sections so that they complete a substantially hemispherical closure over the open top of the receptacle with the front edge of the section 6 overlapping the rim 4.

To facilitate movement of the sections to and from closed or nested position, the section 6 is preferably provided with a suitable knob 40.

In assembling the cover sections, they are mounted in nested position and secured together by the trunnions 18 and 19 to form a unit construction as illustrated in Fig. 6, it being understood that the sections are of sufficient size and shape to conform to the diameter of the receptacle on which they are to be used.

The unit is then fitted over the receptacle by first engaging the rim within the channel shaped groove 30 and then moving the clip shaped heads of the trunnions into straddling engagement with the rim 4. When in locked position, the cover is securely anchored to the receptacle against accidental removal due to the fixed spacing of the clips 21 and 22 and the groove 30.

In the form of the invention illustrated in Fig. 8, the sections do not have the interengaging flanged portions, but the sections 6, 7 and 8 have tongues 41 projecting from the ends thereof adjacent one of their trunnions which terminate in laterally extending lugs adapted to engage the rear edges of the sections 7, 8 and 9, respectively. The trunnion 42 which mounts that side of the sections is extended sufficiently to accommodate thereon an actuating member 43 which forms an integral part of the section 6. The actuating member 43 has wings 44 thereon which may be gripped by the fingers and rotated to move the first section toward closed position. When this occurs the tongue on the first section will engage and pick up the second section and the tongue on the second section will engage the third and so on to move the sections to covering position.

Fixed on the actuating member is an inwardly extending tongue 45 which is adapted to engage the front edges of all the sections when the actuating member is rotated in the opposite direction to pick up and move the sections to nested position.

In the form of invention shown in Fig. 10, the actuator includes a washer member 46 rotatably mounted on the trunnion 47 and which has tongues 48 extending radially therefrom and terminating in different length lateral lugs 49 for respectively engaging the rear edges of the respective sections 6, 7, 8 and 9.

The washer member is rotated by a cup shaped member fixed thereto and operated by a wing 50. To return the sections to nested position, the washer member has an inwardly extending tongue 51 complementary to the tongue 45 on the form of the invention shown in Fig. 8.

The forms of the invention shown in Figs. 8 and 10 are attached to a receptacle in the same manner as that of the preferred form.

From the foregoing, it is obvious that I have provided a cover of collapsible nature that may be readily attached to and become a part of an existing receptacle and that it is easily manipulated to and from open or closed position.

It is also apparent that the cover is of neat and pleasing appearance and adds to the attractiveness of the receptacle.

What I claim and desire to secure by Letters Patent is:

1. A cover of the character described including spring clips having outwardly-directed, axially-aligned trunnions and lune-shaped cover members axially mounted on the trunnions adapted for nesting one within the other and for projection to form a semi-spherical cover for a receptacle, and oppositely directed lips on opposite edges of the cover members, engageable in train as the cover members are projected from nested to functional position.

2. A cover of the character described including spring clips having outwardly-directed, axially-aligned trunnions and lune-shaped cover members axially mounted on the trunnions adapted for nesting one within the other and for projection to form a semi-spherical cover for a receptacle, one of the end cover members having a groove in its outer edge for yieldingly receiving the rim of a receptacle to anchor said member thereto.

3. A cover for a receptacle including a plurality of lune-shaped cover members adapted to nest one within another, trunnions pivotally mounting the cover members on a common axis, clips mounting the trunnions on opposite diametrical sides of the receptacle, and oppositely disposed lips on opposite edges of said cover members for successively limiting projection of the cover members from nested relation to form a substantially hemispherical cover, the inner and outer members having edges arranged to closely engage the rim of the receptacle when the cover members are in closed position.

JOSE A. ROBLES.